United States Patent [19] [11] 4,060,843
Bost [45] Nov. 29, 1977

[54] PROTECTION CIRCUIT FOR MULTIPLE PHASE POWER SYSTEMS

[76] Inventor: Charles H. Bost, Rte. 3, Box 43-A, Winter Haven, Fla. 33880

[21] Appl. No.: 670,121

[22] Filed: Mar. 25, 1976

Related U.S. Application Data

[63] Continuation-in-part of Ser. No. 516,464, Oct. 21, 1974, abandoned.

[51] Int. Cl.² .............................................. H02H 3/24
[52] U.S. Cl. ........................................ 361/76; 361/89; 361/92
[58] Field of Search ................... 317/27 R, 31, 36 TD, 317/46–48; 340/248 A, 248 C, 253 H, 253 Y; 307/127; 361/76, 92, 83, 89

[56] References Cited

U.S. PATENT DOCUMENTS

| 2,486,305 | 10/1949 | Mahnke | 317/27 R X |
| 3,156,848 | 11/1964 | Wood | 340/248 B X |
| 3,535,591 | 10/1970 | Holmquest | 317/27 R |
| 3,743,889 | 7/1973 | Lopez-Batiz | 317/47 X |
| 3,875,463 | 4/1975 | Reuter et al. | 317/27 R X |

Primary Examiner—Harry E. Moose, Jr.
Attorney, Agent, or Firm—Duckworth, Hobby & Allen

[57] ABSTRACT

A protection circuit for use with circuit breakers for electrical apparatus operated by multiple phase, alternating current power systems characterized by a plurality of electrical distribution lines for transmitting electrical energy, with the electrical energy in the lines having a spaced phase relationship. The protection circuit includes a first sensor coupled to the lines for detecting an undesirable phase imbalance between two or more of the lines, and for detecting a low voltage on one or more of the lines, and initiating a first signal responsive to either or both of these conditions. The protection circuit also includes a second sensor coupled to the lines for detecting a phase reversal between two or more of the lines and initiating a second signal responsive thereto. A circuit breaker operating circuit is coupled to the second sensor for operating the circuit breaker responsive to the second signal. Time delay circuitry is coupled between the first sensor and the circuit breaker operating circuit for initiating the second signal responsive to the first signal being received thereby for a predetermined period of time. An overvoltage sensor is also coupled to at least one of the lines for detecting an over-voltage condition thereon and initiating the second signal responsive thereto, with the second signal being coupled to the circuit breaker operating circuit for activation thereof.

10 Claims, 6 Drawing Figures

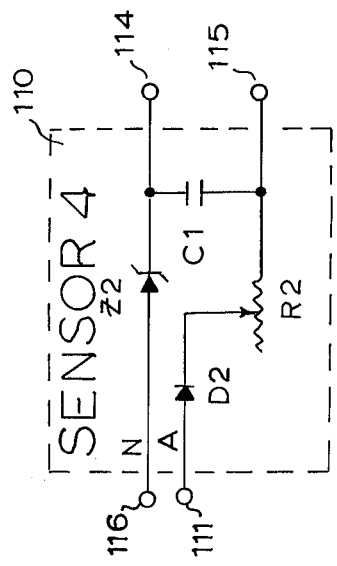
Fig. 5.
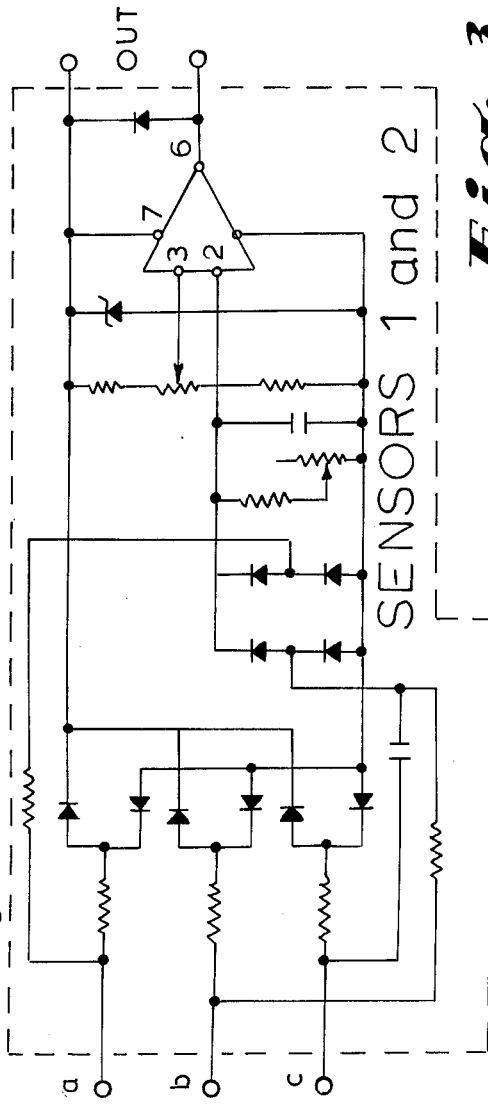
Fig. 3.
Fig. 2.
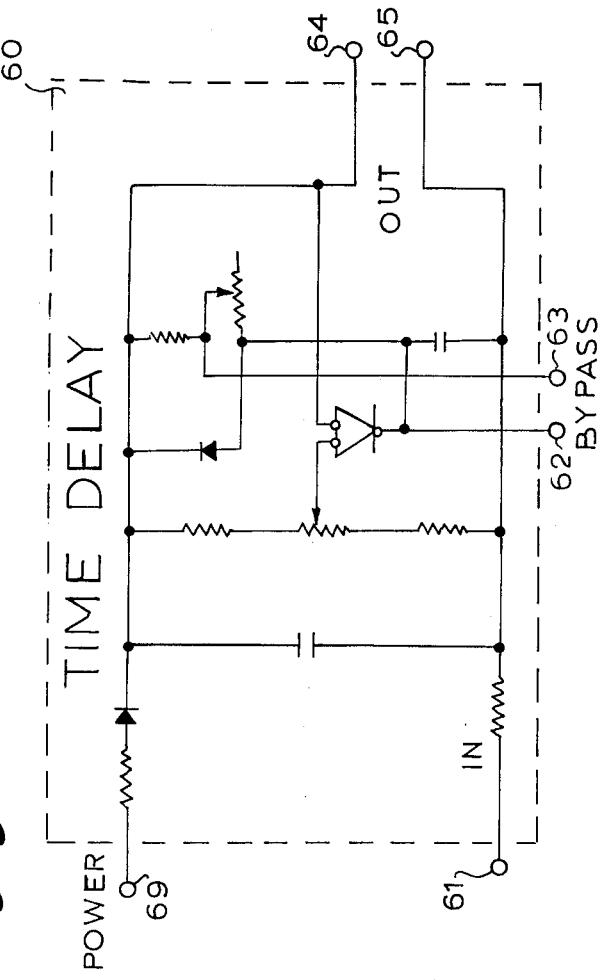
Fig. 4.

PROTECTION CIRCUIT FOR MULTIPLE PHASE POWER SYSTEMS

This is a continuation-in-part application of application Ser. No. 516,464, filed Oct. 21, 1974, now abandoned.

BACKGROUND OF THE INVENTION

Field of the Invention

The present invention relates to electrical protection circuits for use in multiple phase, alternating current power systems. In commercial and industrial power use, the well-known three phase system is widely employed. However, in many cases, the load equipment coupled to such multiple phase systems comprises single phase elements which are connected between two phase lines, or between one phase line and ground. This type of electrical equipment, as well as three phase equipment, is susceptible to damage caused by a number of undesirable operating conditions. The undesirable conditions are:

A. Phase Unbalance

Unbalance of a three phase power system occurs when single phase loads are applied, causing one or two of the lines to carry more or less of the load. Normally, on new installations of three phase power systems, careful attention is given to balancing the load. However, as more and more single phase loads are added to the system, an unbalance may begin to occur. This phase voltage unbalance can cause three phase motors to run at temperatures beyond their published ratings and, if undetected, can result in serious damage to equipment and machinery. In addition to internal overheating, these excessive temperatures cause insulation breakdown and reduce motor life. Standard thermal overload magnetic breakers, and other such apparatus presently available, generally do not detect the gradual load unbalance and for this reason are not considered adequate protection.

B. Phase Loss/Under Voltage

The total loss or severe under-voltage of one of the three phases is a type of phase unbalance. This condition is generally known as "single phasing." The most serious result of this condition is that it can go undetected on most systems for an extended period of time, thus causing a motor coupled to the lines to burn out, since a three phase motor running on less than three phase power will continue to run by drawing all of its current from the remaining two lines. In most cases, this condition will not be detected by measuring the voltage at the motor terminals because the open winding of the motor is generating a voltage nearly equal to the phase voltage that was lost.

Phase loss can also occur when a single phase overload condition causes a fuse to blow, by a three phase circuit being struck by lightning, or by a mechanical failure within the switching equipment associated with the machinery. Attempting to start a three phase motor on single phase power will cause the motor to draw locked-rotor current. Thermal overloads placed in the lines are not always capable of preventing damage to the motor under these conditions. Loss of power on any one phase can also cause all single phase equipment connected to this phase to be operating at extremely low voltage. This could result in equipment damage.

C. Phase Reversal

The reversing of any two of the three phases can cause damage to electrically powered machinery or may result in injury to personnel. This can occur when modifications are made to power distribution systems or when maintenance is performed on cabling and switching equipment. The National Electrical Code requires phase reversal protection on all equipment transporting people, such as elevators and escalators.

D. Circuit Over/Under Voltage

When the voltage existing on all of the three phases exceeds a predetermined limit, the loads coupled to those three phase lines may be damaged by an electrical breakdown in the wiring insulation, or by a thermal overload caused by excessive power output from the load. Such over-voltages can be caused by lightning strikes somewhere along the power distribution system or by momentary shorts within the primary windings of transformers along the power distribution system.

Under-voltages on all phases of the multi-phase line can be caused by a defective generator or by excessive loads being placed upon the power distribution system which exceed the capacity of the generator. Such under-voltage situations occur after a momentary power loss when many electrical motors, each drawing a very large starting current, are simultaneously started by the reapplication of power to the three phase lines. When an under-voltage situation occurs on all phases of the power distribution system, some loads, such as certain types of motors, tend to draw excessive current in order to maintain a specified power output. This excessive current drawn by the motors causes a rapid heat build up within the motor, which in turn can cause failure of the insulation or an overheating of critical parts.

Description of the Prior Art

A variety of prior art circuits have been developed for detecting undesirable voltage conditions on one or more of the lines of a multiple phase system (such as a loss of phase or under-voltage), as well as detecting undesirable phase relationships between two or more lines (such as a phase unbalance or reversal). Examples of such devices are described in the following U.S. Pat. Nos. 3,743,889 to Lopez-Batiz; 3,260,897 to Parker; 3,157,826 to Norton, as well as others. Additionally, some prior art circuits rely upon the detection of a blown fuse to detect over voltages for operating a shunt trip relay or similar protection device. See, for example, U.S. Pat. Nos. 1,116,566 to Conrad; Re 22,973 to Kurtz; 3,510,811 to Pokorney et al; as well as others. However, these circuits are not sensitive to phase unbalance or reversal. Another prior art circuit of interest is described in U.S. Pat. No. 1,314,332 to Jones.

Patents which include phase unbalance or reversal conditions include: Fletcher et al in U.S. Pat. Nos. 3,783,354; Reeder et al in U.S. Pat. No. 2,977,511; Jonas in U.S. Pat. No. 1,748,451; Lopez-Batiz in U.S. Pat. No. 3,743,889; Ford et al in U.S. Pat. No. 3,736,470; and Forsyth et al in U.S. Pat. No. 3,013,185.

SUMMARY OF THE INVENTION

The present invention contemplates a protection circuit for use with circuit breaker means for electrical apparatus operated by a multiple phase, alternating current systems characterized by a plurality of electrical distribution lines for transmitting electrical energy, with the electrical energy in the lines having a spaced phase relationship. The protection circuit includes first sensing means coupled to the lines for generating a first signal responsive to detecting an undesirable phase imbalance between two or more of the lines and responsive to detecting a low voltage on one or more of the lines. Second sensing means are coupled to the lines for detecting a phase reversal between two or more of the lines and initiating a second signal responsive thereto. Circuit breaker operating means are coupled to the second sensing means for operating the circuit breaker means responsive to the second signal. Time delay means are operably coupled between the first sensing means and the circuit breaker operating means for initiating the second signal responsive to the first signal being received for a predetermined period of time.

In a first preferred embodiment, power selector means are coupled to at least two of the lines for supplying a power output from a priority one of the lines to the circuit breaker operating means, with the power selector means selecting another line responsive to a loss of power on the priority line. Over-voltage sensing means are also coupled to at least one of the lines for detecting an over-voltage condition thereon and initiating a second signal responsive thereto. The second signal is coupled to the circuit breaker operating means for activation thereof.

THE DRAWINGS

FIG. 2 illustrates a first preferred embodiment for sensors 1 and 2 as shown in FIG. 1.

FIG. 3 is a first preferred embodiment for the time delay circuit as shown in FIG. 1.

FIG. 4 is a first preferred embodiment of sensor 3.

FIG. 5 is a first preferred embodiment for sensor 4.

DETAILED DESCRIPTION OF THE PREFERRED EMBODIMENT

Figure 1:
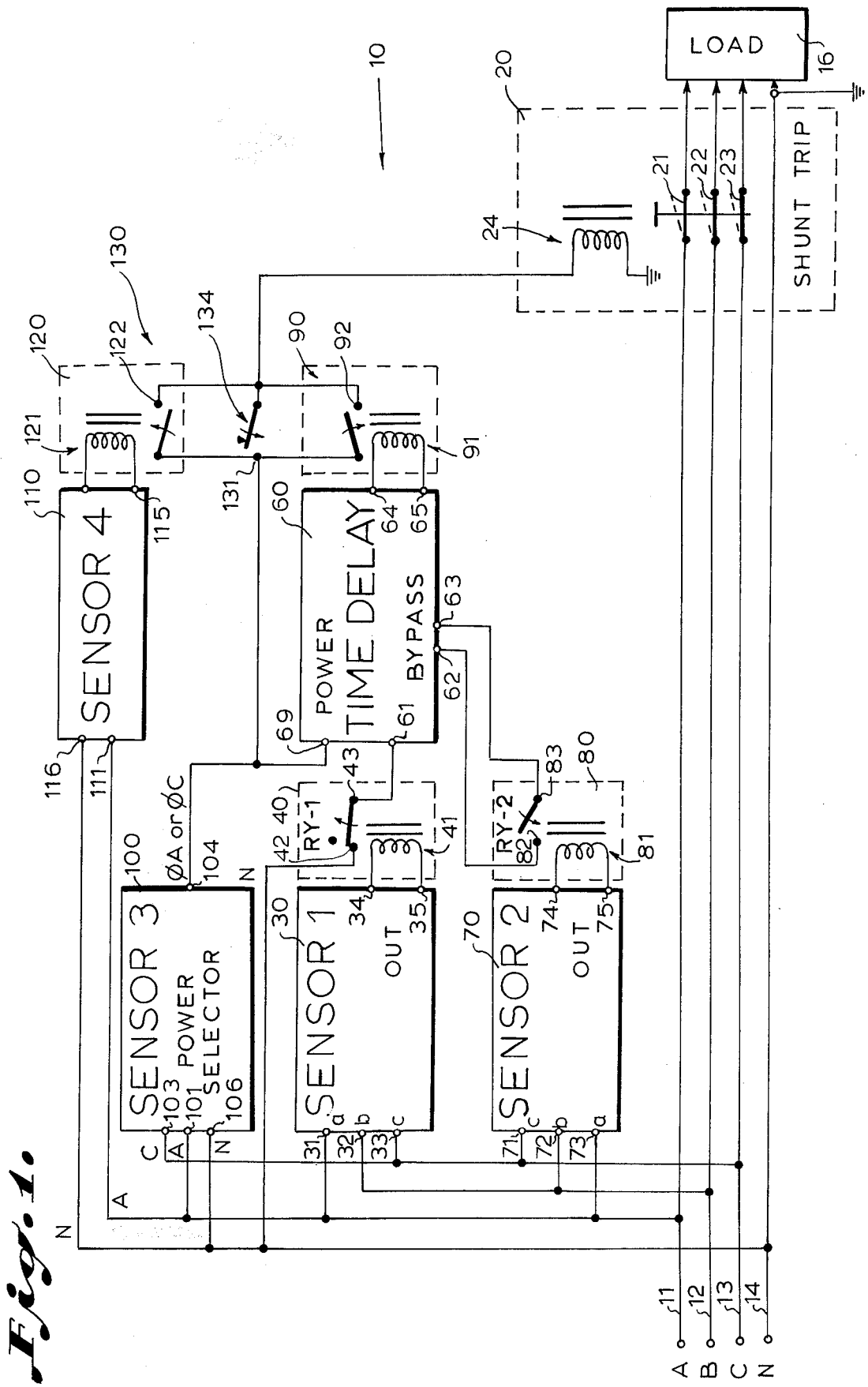
FIG. 1 illustrates a schematic block diagram representation of a protection circuit.

A first embodiment of a protection circuit in accordance with the present invention will now be described with reference to FIG. 1. The protection circuit, referred to generally as 10, is adapted for use with multiple phase, alternating current distribution systems, such as the three phase system shown in the drawings, employing three distribution lines 11, 12 and 13, each carrying a phase voltage having a predetermined positive phase sequence normally spaced apart by 120 electrical degrees. A neutral or ground line 14 may be provided with the three phase system.

An electrical load 16 is coupled to the distribution lines 11, 12 and 13. While the load 16 is shown as a single unit, this load may comprise a plurality of individual, single phase loads which are coupled between the distribution lines 11, 12 and 13. Window air conditioners are typical examples of such single phase loads. A three phase load such as a large commercial air conditioner is another typical example of a load 16.

A circuit breaker 20, such as a shunt trip relay, is provided having switch contacts 21, 22 and 23, each of which is interposed in the corresponding one of the distribution lines 11, 12 and 13. The breaker 20 further includes a coil 24 for opening the contactors 21-23 when an appropriate potential is placed thereacross. It will be appreciated by those skilled in the art that various other circuit "make or break" devices may be substituted in lieu of the shunt trip operated breaker 20 described above. It will further be understood by those skilled in the art that the terms "circuit breaker" is to be construed broadly as including any device which makes or breaks a circuit line 11-13 responsive to operation of the protective circuit 10, described in greater detail below. Thus, in addition to the shunt trip relay breaker 20 shown in the drawings, magnetic motor starters, motorized breakers and switches, and equivalent devices may likewise be energized responsive to the operation of the protective circuit 10. Likewise, the term "relay" should be broadly construed to cover all types of electronic switching devices.

A first sensor 30 having three input terminals 31, 32 and 33, each of which is coupled to one of the distribution lines 11-13, is provided for detecting an undesirable phase imbalance between two or more of the power distribution lines and for detecting a low voltage on one of the power distribution lines. Responsive to any or all of these conditions occurring, the first sensor 30 will generate a first signal which is coupled through the output terminals 34 and 35 to the coil 41 of a first relay 40. Stated another way, the coil 41 of the RY-1 relay 40 is de-energized by the first sensor 30 when any one or more of the following conditions occurs: a phase imbalance exists between any two of the power distribution lines 11, 12 and 13; the voltage and power along any one of the power distribution lines 11, 12 and 13 is lost; and the voltages along the power distribution lines 11, 12 and 13 fall below a predetermined minimum voltage.

When the coil 41 of the relay 40 is de-energized, switch contacts 42 and 43 will be closed, thereby placing a ground at the input 61 of a time delay circuit 60. The time delay circuit 60 will generate a second signal at its outputs 64 and 65 responsive to the first signal being received from the first sensor 30 for a predetermined period of time. In the first preferred embodiment, this first signal has the form of a neutral or ground wire being connected to the input 61 of the time delay circuit 60 by the operation of the first relay 40. The period of the time delay may be varied by adjusting an internal electrical time constant to select a time delay which is sufficiently long to prevent "chattering" of the relay. Nuisance tripping or chattering can occur from momentary phase imbalances and voltage drops which occur in normal useage and which generally are not likely to produce damage to the load 16.

A second sensor 70, having inputs 71, 72 and 73, is also coupled to the power distribution lines 11, 12 and 13. However, the second sensor 70 is coupled in a reversed phase relationship to the power distribution lines, so that the first input 71 is coupled to the C phase power distribution line 13 and the third input 73 is coupled to the A phase power distribution line 11. In this manner if phases A and C of the power distribution lines 11 and 13 are incorrectly connected, the second sensor 70 will generate a second signal at outputs 74 and 75 which are coupled to the coil 81 of the RY-2 relay 80. The energizing of the coil 81 of the relay 80 closes relay contacts 82 and 83, thus shorting two bypass input terminals 62 and 63 of the time delay 60. When the bypass input terminals 62 and 63 are shorted, the time delay circuitry 60 will immediately generate the second signal at the output terminals 64 and 65. Thus, whenever the phase of the power distribution lines 11, 12 and 13 are reversed, the delay period of the time delay circuitry 60 will be bypassed causing the second signal to be immediately produced at the outputs 64 and 65 thereof.

A third sensor or power selector means 100 includes at least two power inputs. One input 11 is coupled to phase A, a second input 103 is coupled to phase C and a neutral input 106 is coupled to the neutral line. The third sensor or power selector means 100 has an output 104 for supplying AC power from a priority one of the input power distribution lines. With reference to FIG. 4, a first preferred embodiment of the power selector means 100 is illustrated as comprising a relay RY-3 which is energized by the rectified current flowing through a diode D1, an adjustable resistor R1, a coil of relay RY-3, and a zener diode Z1 to the neutral line 106. When relay RY-3 is activated, the relay contact RY-3a is shorted to contact RY-3c, thus coupling the AC power from the priority line, or phase A input 101, to the output 104. When no voltage or a low voltage is present on the phase A input 101, the relay RY-3 will not be activated, thus coupling the relay contacts RY-3d and RY-3e which will provide the ground or neutral required to energize the coil of relay RY-4, which is powered by phase C through the input 103. When the relay RY-4 is activated, the relay contact RY-4a will be coupled to the relay contact RY-4c, thus applying the AC power from phase C through the input 103 to the output 104. It should be noted that when the relay RY-3 is not energized, the relay contact RY-3a will be coupled to relay contact RY-3b, thereby disconnecting the phase A input 101 from the output 104.

Summarizing the operation of the power selector and third sensor 100, the phase A input 101 or priority line will be coupled through the relay RY-3 to the output 104 whenever the voltage on that input exceeds a predetermined minimum. When no voltage or a low voltage is present on the phase A input 101, the relay RY-3 and the relay RY-4 will couple the phase C input 103 to the output 104. Returning now to FIG. 1, the output 104 of the power selector 100 is coupled to the power input 69 of the time delay means 60 for providing continous AC power to energize the electrical circuits therein regardless of the loss of power to the A phase or the C phase power distribution lines.

A fourth sensor 110, having a first input 111 coupled to the phase A power distribution line 11 and a second input 116 coupled to the neutral line 14, operates as an over-voltage sensor. When the voltage on the phase A input 111 exceeds a predetermined maximum, the fourth sensor 110 generates a second signal, or output voltage, across outputs 114 and 115., thus energizing a relay coil 121 of a relay 120. With specific reference to FIG. 5, the first preferred embodiment of the circuitry utilized in the fourth sensor 110 is illustrated as comprising a diode D2 to be forward biased in series with the A phase power distribution line input 111, coupled to a variable resistor R2, coupled to a series capacitor C1, and coupled to a reversed biased zener diode Z2 in series with the neutral line input 116. One skilled in the art will immediately realize that if the zener diode Z2 is chosen with a sufficiently large reverse bias voltage value, then the voltage across the capacitor C1, which is also the output voltage across terminals 114 and 115, will be essentially zero until the phase A voltage at input 111 exceeds the Zener voltage value. Therefore, by choosing the appropriate value of zener diode Z2 to correspond with the maximum allowable voltage, the output voltage across terminals 114 and 115 will be representative of an over-voltage condition.

Returning now to FIG. 1, the output terminals 114 and 115 of the fourth sensor 110 are coupled to the coil 121 of the relay 120. Likewise, the outputs 64 and 65 of the time delay means 60 are coupled to a coil 91 of the relay 90. The relays 90 and 120 together comprise the circuit breaker operating means. The voltage from the output 104 of the power selector 100 is coupled to a first terminal 131 which is common to both the relay 90 and the relay 120. When the relay 90 is activated responsive to the outputs 64 and 65 from the time delay circuit 60, the AC power present at the terminal 131 will be coupled to the terminal 92 of the relay 90 and then into the coil 24 of the shunt trip relay 20. In a similar manner, when the relay 120 is operated by energizing the coil 121 across the outputs 114 and 115 of the fourth sensor 110, the AC power present at terminal 131 will be coupled to relay terminal 122 and then into the coil 24 of the shunt trip relay 20. Of course, under either of these conditions when current is caused to pass through the coil 24 of the shunt trip relay 20, the contacts 21, 22 and 23 will be opened, thus removing the voltage along the power distribution lines from the load 16.

Another switch 134 is included between the coil 24 of the shunt trip relay 20 and the terminal 131 of the circuit breaker operating means 130 to allow for the manual operation of the shunt trip relay 20. The accessory switch 134 may be remotely located to provide an emergency over-ride for the automatic operation of the shunt trip relay 20.

The electrical circuitry utilized in the first sensor 30 and the second sensor 70 is illustrated in FIG. 2. The design and operation of this circuitry are well known in the art. The electrical circuits used in the first sensor 30 and second sensor 70 comprise a differential amplifier having two inputs for comparing the amplitude and phase relationship between the three phase power distribution inputs. Other circuitry having similar functional capabilities could be substituted without departing from the spirit and scope of the invention.

The circuitry utilized in the time delay means 60 is illustrated in FIG. 3. This circuitry also is well known in the art. Basically, an adjustable RC circuit is utilized to determine the time constant of the delay period or predetermined time. The resistor in the RC time constant circuit is shorted for producing an immediate output responsive to signals present at the bypass input.

The operation of the protection circuit 10 will now be summarized. Initially, it will be assumed that the voltage and phase conditions along the distribution lines 11 through 13 are in good order. The contacts 21, 22 and 23 of the shunt trip relay 20 are closed to energize the load 16. When an undesirable phase imbalance occurs between two or more of the distribution lines 11, 12 and 13, or when the voltage present on one or more of the distribution lines 11, 12 and 13 does not exceed a predetermined minimum voltage, then a first signal is generated by the first sensor 30 for de-energizing the relay 40 which initiates the clocking of a predetermined time interval by the time delay means 60. If the first signal continues to be present at the input 61 of the time delay means 60 for the duration of the predetermined time, or if the integrated "on time" for the first signal would be sufficient to allow the build up of a voltage across an RC timing circuit for the aforementioned predetermined time period, then the coil 91 of the relay 90 will be energized thus providing power to the coil 24 of the shunt trip relay 20 which will cause the relay to open.

If the second sensor 70 detects a phase reversal between two or more of the power distribution lines, a second signal will be generated by the second sensor 70 causing the relay 80 to be energized, thereby energizing the bypass inputs 62 and 63 of the time delay means 60 and immediately energizing the coil 91 of the relay 90.

This will immediately apply power to energize the relay coil 24 of the shunt trip relay 20 causing the relay contacts 21, 22 and 23 to open, thereby removing the voltage from the load 16.

If the voltage present on a typical one of the distribution lines 11, 12 and 13 exceeds a predetermined maximum, the fourth sensor 110 will generate another one of the second signals, thus energizing the coil 121 of the relay 120, which in turn couples power to the relay coil 24 of the shunt trip relay 20, thereby opening the contacts 21, 22 and 23. The power selector or third sensor 100 will switch between two of the power distribution lines to assure that power is available for supplying power to the time delay means 60, the circuit breaker operating means 130 and the relay coil of the shunt trip relay. The shunt trip relay may be remotely opened, or the operation of the protection circuit may be over-ridden by manually closing the remote switch 134 connected to the circuit breaker operating means.

Figure 6:
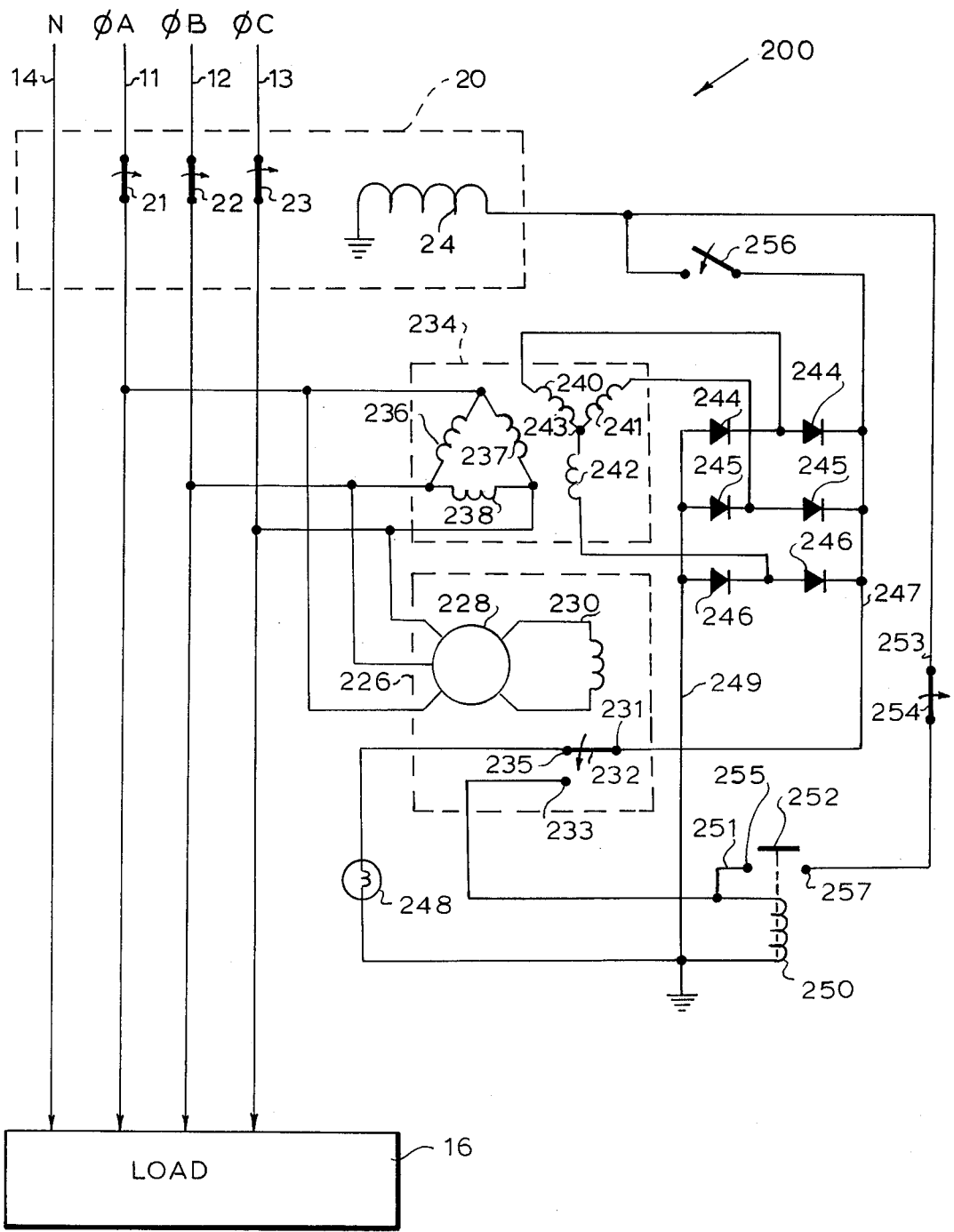
FIG. 6 is a second preferred embodiment of the present invention.

A second preferred embodiment of the present invention is designated as 200 in FIG. 6. A phase sensor 226 is provided having three input terminals each of which is coupled to one of the distribution lines 11-13, preferably between the shunt trip relay or breaker 20 and the load 16. The phase sensor 226 may comprise any one of a variety of commercially available phase monitoring devices of the type described with regard to those prior art patents set forth. A suitable monitor is manufactured by Diversified Electronics, Inc. of Evansville, Indiana and is identified as Series UPA. The phase sensor 226 of this type includes a phase monitoring circuit 228 (shown generally as a circle in FIG. 6) and a relay having a coil 230 and at least one contactor 232 which is operated when an appropriate voltage is placed across the coil 230 as an output of the monitoring circuit 228. An input terminal 231 is coupled to the contactor 232, and two output terminals 233 and 235 are also provided.

Means for supplying a voltage from the distribution lines 11-13 are also coupled thereto. In the second preferred embodiment, the voltage supplying means comprises a control transformer 234 having three primary windings 236, 237 and 238, and three corresponding secondary windings 240, 241 and 242. The primary windings 236-238 are connected in a delta configuration. The secondary windings 240-242 are connected in a Wye configuration with a common return 243. A full wave rectifier 244, 245 or 246 is coupled to the corresponding one of the secondary windings 240-242 and between the circuit lines 247 and 249. Each full-wave rectifier 244-246 includes two diodes, as shown in FIG. 6. As an alternative, half-wave rectifiers may be used in lieu of the full-wave rectifiers by placing a single forward-pulled diode between each secondary winding 240-242 and the circuit line 247, and then coupling the circuit line 249 to the common return 243 of the secondary. However, when such a half-wave rectifier is employed, care should be exercised in selecting a relay of the type having slow release contacts, in order to prevent contact "chattering" in that relay.

A pilot light 248 is coupled to the first output terminal 235 of the contactor 232 associated with the phase sensor 226. A time delay relay is provided, having a coil 250 coupled between the output terminals 233 and 235, and a contactor 232 which is moved to make or break a circuit responsive to the appearance of an operating potential across the coil 250. The circuit line 249 is coupled between the pilot light 248 and the coil 250. One terminal 255 of the time delay relay is coupled to the side of the coil 250 connected to the terminal 233 via circuit line 251. The other terminal 257 of the time delay relay is coupled via circuit line 253 to coil 24 of the shunt trip relay breaker 20.

Two manual switches are provided, the first manual switch 254 being interposed along the circuit line 253 between the time delay relay 250 and the coil 24 of the circuit breaker 20. The second manual switch 256 is remote from the circuit 200 and is interposed in a circuit line between the output of the rectifiers 244-246 and the coil 24 of the circuit breaker 20.

The operation of the protection circuit 200 will now be described with reference to FIG. 6. Initially, it is assumed that the voltage and phase conditions along the distribution lines 11-13 are in good order. Under these conditions, an output is provided from the monitoring circuit 228 of the phase sensor 226 such that the coil 230 is energized and the contactor 232 remains closed, thus maintaining a connection between the terminals 231 and 235. The voltage across any two of the lines 11-13 continuously appears across each of the corresponding primary windings 236-238 of the control transformer 234. As a result, there is a continuous, recitified output from the secondary windings 240-242 and into the contactor 232 of the phase sensor 226. This current is carried between the terminals 231 and 235, through the pilot light 248 and through the circuit line 249. Thus, when no undesirable line conditions are present, the pilot light 248 is illuminated.

However, when an undesirable phase imbalance, phase loss or phase reversal is detected on one of or between two of the distribution lines 11-13, the output is disrupted from the monitoring circuit 228 to de-energize the coil 230. De-energization of the coil 230 opens the contactor 232, thus applying the recitified output from the second windings 240-242 of the control transformer 234 through the terminals 231 and 233 and across the coil 250 of the time delay relay. Upon energization of the coil 250 of the time delay relay, the contactor 252 makes a circuit connection between the circuit line 251 and 253, after the predetermined time delay has expired. In this example, the delay period is preferably on the order of 30 seconds. Assuming that the manual switch 254 is closed, the recitified output of the secondary windings 240-242 is impressed across the coil 24 of the circuit breaker 20 which causes the contactors 21-23 to open. If required for emergency purposes, the rectified output of a secondary winding can be impressed directly across the coil 24 of the circuit breaker 20 by closing the manual switch 256.

The preferred embodiment for the protection circuit has been described as an example of the invention as claimed. However, the present invention should not be limited in its application to the details in construction illustrated in the accompanying drawings of the specification, since this invention is capable of other embodiments and of being practiced or constructed in a variety of other embodiments. Also, it must be understood that the terminology and descriptions employed herein are used solely for the purpose of describing the preferred embodiment and therefore should not be construed as limitations on the operability of the invention.

I claim:

1. A protection circuit for use with circuit breaker means for electrical apparatus operated by multiple phase, alternating current power systems characterized by a plurality of electrical distribution lines for transmitting electrical energy, the electrical energy in said lines having a spaced phase relationship, wherein said protection circuit comprises:

first sensing means coupled to said lines for generating a first signal responsive to detecting an undesirable phase imbalance between two or more of said lines, and detecting a low voltage on one of said lines, and detecting a low voltage on more than one of said lines;

second sensing means coupled to said lines for detecting a phase reversal between two or more of said lines, said second sensing means initiating a second signal responsive thereto;

circuit breaker operating means coupled to said second sensing means for operating said circuit breaker means responsive to said second signal;

time delay means operably coupled between said first sensing means and said circuit breaker operating means, said time delay means for initiating said second signal responsive to said first signal being received for a predetermined period of time; and power selector means coupled to at least two of said lines for supplying a power output from a priority one of said lines to said circuit breaker operating means, with said power selector means selecting another one of said lines responsive to a loss of power on said priority line.

2. The protection circuit as described in claim 1 wherein said power selector means comprises:

third sensing means coupled to said priority line for generating a third signal responsive to detecting an undesirably low voltage thereon and detecting a loss of voltage thereon; and a power selector relay coupled to said third sensing means, to said priority line and to said another one of said lines for selecting as said power output said priority line, and for selecting as said output said another one of said lines responsive to said third signal.

3. The protection circuit as described in claim 1 wherein said circuit breaker operating means comprises a first relay operating responsive to said second signal, said first relay for coupling said power output of said power selector means to said circuit breaker for activation thereof.

4. The protection circuit as described in claim 3 wherein said power output of said power selector means is AC power.

5. The protection circuit as described in claim 3 wherein said power output of said power selector means is coupled to said time delay means for supplying power thereto.

6. The protection circuit as described in claim 1 further comprising fourth sensing means coupled to at least one of said lines for detecting an over-voltage thereon and for initiating said second signal responsive thereto, said second signal being coupled to said circuit breaker operating means for activation thereof.

7. The protection circuit as described in claim 6 wherein said circuit breaker operating means further comprises a second relay coupled to said fourth sensing means, and operating responsive to said second signal therefrom for coupling said power output of said power selector means to said circuit breaker means for activation thereof.

8. The protection circuit as described in claim 6 wherein said time delay means comprises an electrical circuit having adjusting means for varying said predetermined period of time.

9. The protection circuit as described in claim 1 further comprising first remote control means coupled to said circuit breaker operating means for remotely initiating said second signal thereto, whereby said remote control means may remotely activate said circuit breaker means.

10. A protection circuit for use with circuit breaker means for electrical apparatus operated by multiple phase, alternating current power systems characterized by a plurality of electrical distribution lines for transmitting electrical energy, the electrical energy in said lines having a spaced phase relationship, wherein said protection circuit comprises:

first sensing means coupled to said lines for initiating a first signal responsive to detecting an undesirable phase imbalance between two or more of said lines, and detecting a low voltage on one or more of said lines;

second sensing means coupled to said lines for detecting a phase reversal between two or more of said lines, said second sensing means initiating a second signal responsive thereto;

circuit breaker operating means coupled to said second sensing means for operating said circuit breaker means responsive to said second signal;

time delay means operably coupled between said first sensing means and said circuit breaker operating means, said time delay means for initiating said second signal to said circuit breaker operating means responsive to said first signal being received for a predetermined period of time;

over-voltage protecting means coupled to at least one of said lines for detecting an over-voltage thereon and initiating said second signal responsive thereto, said second signal being coupled to said circuit breaker operating means for activation thereof; and power selector means coupled to at least two of said lines for supplying an output of AC power from a priority one of said lines to said circuit breaker operating means, said power selector means selecting said another one of said lines responsive to a loss of AC power on said priority line.

* * * * *